BEST AVAILABLE COPY

BEST AVAILABLE COPY

2 Sheets—Sheet 1.

J. DEWE.

SEAL-LOCKS.

No. 7,666.

Reissued May 8, 1877.

WITNESSES:

Jas. E. Hutchinson

Henry C. Hazard.

INVENTOR.

John Dewe, by

Prindle & Fox his Attys

2 Sheets—Sheet 2.

J. DEWE.

SEAL-LOCKS.

No. 7,666. Reissued May 8, 1877.

WITNESSES.
Jas. E. Hutchinson.
Henry C. Hazard.

INVENTOR.
John Dewe, by
Prindle & Day his Attys

No 7666

BEST AVAILABLE COPY

May 5, 1877; application filed April 11, 1877.

*To all whom it may concern:*

Be it known that I, JOHN DEWE, of Ottawa, in the county of Carleton, Province of Ontario, Canada, did invent certain new and useful Improvement in Seal-Locks, for which Letters Patent No. 95,204 were issued to me upon the 28th day of September, 1869, which Letters Patent have been found defective, in that the specification and claim does not cover and embrace all of the original invention, as set forth in the application filed in the Patent Office on the 26th day of July, 1869. Now, therefore, being desirous of reissuing said Letters Patent, herewith surrendered, I have prepared and do hereby declare that the following is a full, clear, and exact description thereof, reference being had to the accompanying drawing, making a part of this specification, in which—

Figure 1:
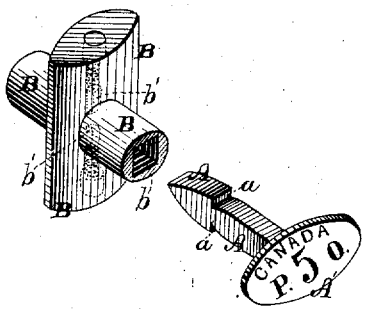
Figure 2:
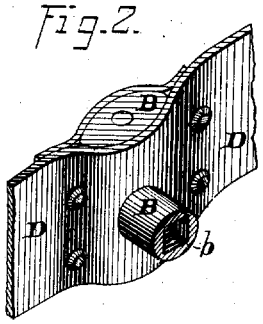
Figure 3:
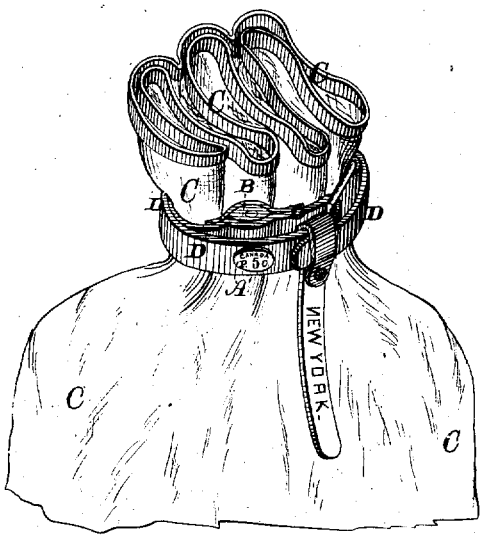
Figure 4:
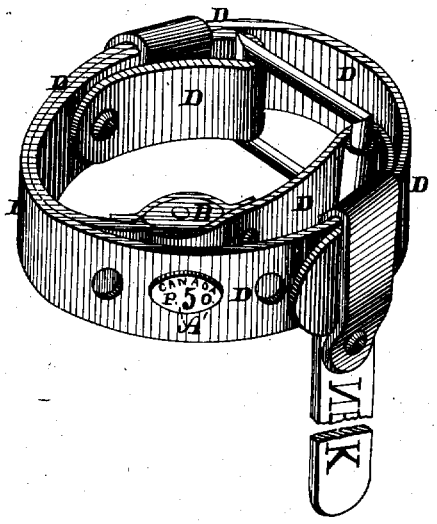
Figure 5:
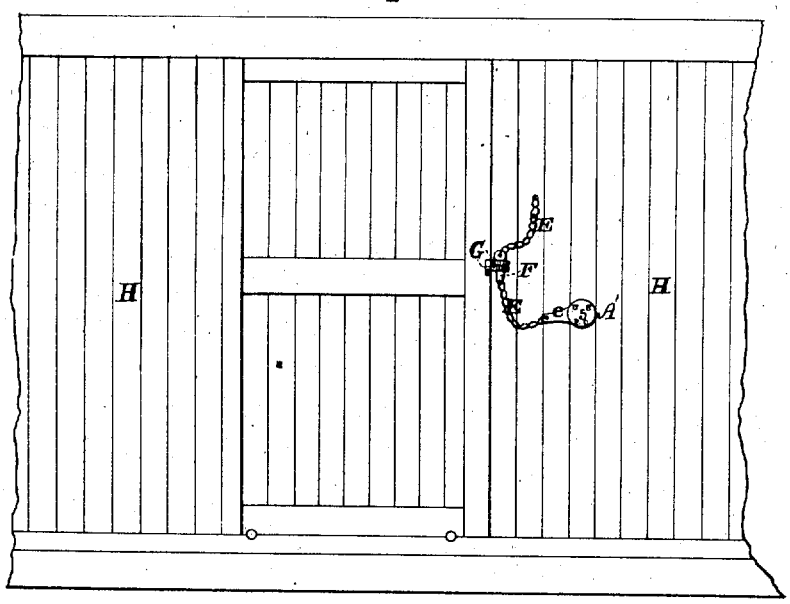
Figure 6:
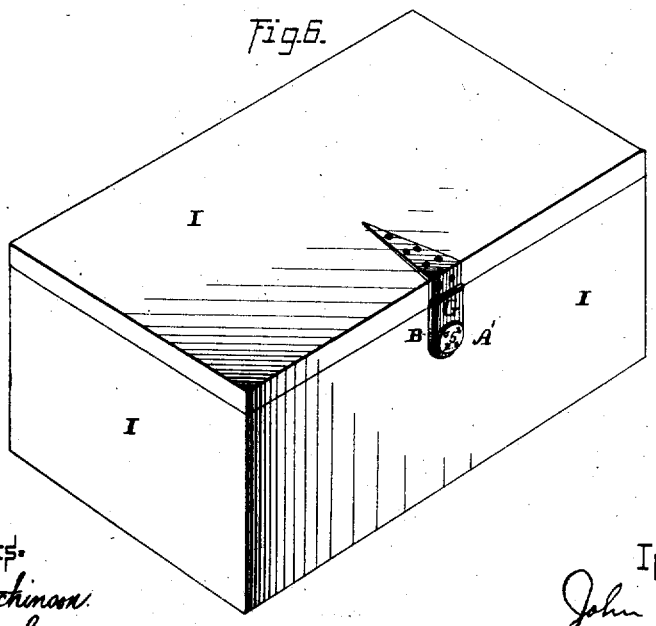

Figure 1 is a perspective view of my improved lock and seal separated from each other. Fig. 2 is a like view of said lock attached to the strap of a mail-bag. Fig. 3 is a perspective view of a mail-bag, having its open end closed by said strap and lock. Fig. 4 is a like view of said strap detached from said mail-bag, but arranged in the position occupied when coiled around the neck of the same. Fig. 5 is an elevation of the side of a car having its door sealed with one of my locks, and Fig. 6 is a perspective view of a trunk or chest, provided with said lock for securing and sealing the hasp, which confines the lid in place when closed.

Letters of like name and kind refer to like parts in each of the figures.

The design of my invention is to enable mail-bags, cars, trunks, and other appliances for containing valuable articles, to be securely sealed, so as to prevent employés or others from tampering with their contents, without rendering such persons liable to detection; to which end it consists in combining, with a hasp, a key arranged to pass inward through the same, and have its inner end engaged by detents, and provided at its outer end with a seal, which is outside of and bears against the outer face of said hasp, whereby the latter is locked in place while said seal is unbroken, substantially as and for the purpose hereinafter specified.

My invention is applicable to any kind or form of receptacle for containing valuable articles; but its construction and operation will be fully illustrated by a description of its use in connection with mail-bags, car-doors, and chests, which articles will be taken up in the order named.

In the annexed drawings, A represents the body of my key which, at its inner end, is pointed, while at its outer end is provided a flat head, A′, that is arranged at a right angle to the said body.

For the reception of the key A is provided a lock, which consists of a casing, B, that has a length somewhat greater than the former, and is provided with an opening, *b*, which corresponds to the dimensions of said key, and permits of the insertion of the latter within said casing.

At suitable points within the sides of the casing B are provided spring-detents *b′*, which are moved outward by the pointed end of the key A as the latter is moved inward, and when said key reaches its inner position, said detents engage with suitable notches *a* that are formed upon its edges and prevent its withdrawal.

The key A and its head A′ are constructed from lead or other metal or material which is easily broken, and in use it is intended that said head shall be broken from said key and the latter then pushed inward through the lock, after which a new key may be inserted within the latter.

The device is employed in connection with a mail-bag, C, by securing the lock B within the strap D near one end, passing said strap around the open end of said bag in any well-known manner, and then placing the opposite end of said strap over the outer end of said lock, and passing the key through a suitable opening in said strap end into said lock, the head or seal A′ being upon the outer side of said strap.

As thus arranged it will be seen that the ends of the strap cannot be disconnected without the breaking of the seal head A′ from the key A.

For use upon cars, one end of a small chain, E, is attached to the lower end of the pin F, which locks the hasp G in place, and upon the opposite end of said chain is secured a small plate, *e*, that is provided with an opening for the passage of the key A when, after said locking-pin is in place, said plate may be securely locked beneath the head or seal A′, the lock B being placed within the side H of said car near said hasp G.

For use in connection with a chest or trunk, I, the lock B is placed within the front wall of the article in such position as to enable the hasp G to be closed down upon said lock, after which the key A is inserted into said lock through a suitable opening in said hasp, and the seal-head A′ confines the latter in place.

Any desired marks may be applied to the head or body of the seal-key, so as to render impracticable its removal and the substitution of another, without detection, by persons who are not duly authorized and provided with duplicates for such purpose.

Having thus fully set forth the nature and merits of my invention, what I claim as new is—

In combination with a hasp, a key arranged to pass inward through the same, and have its inner end engaged by detents, and provided at its outer end with a seal, which is outside of and bears against the outer face of said hasp, whereby the latter is locked in place while said seal is unbroken, substantially as and for the purpose specified.

In testimony that I claim the foregoing I have hereunto set my hand and seal this 27th day of March, 1877.

JOHN DEWE. [L. S.]

Witnesses:

I. D. PATERSON,

LE F. ANSTRUTHER MAINGY.